United States Patent
Gu et al.

(10) Patent No.: US 11,968,093 B1
(45) Date of Patent: Apr. 23, 2024

(54) EFFICIENT SCALING OF A DOMAIN NAME SYSTEM SERVICE ARCHITECTURE

(71) Applicant: NortonLifeLock Inc., Tempe, AZ (US)

(72) Inventors: Lei Gu, Bedford, MA (US); Michael Shavell, Merrimack, NH (US)

(73) Assignee: GEN DIGITAL INC., Tempe, AZ (US)

( * ) Notice: Subject to any disclaimer, the term of this patent is extended or adjusted under 35 U.S.C. 154(b) by 0 days.

(21) Appl. No.: 17/933,586

(22) Filed: Sep. 20, 2022

(51) Int. Cl.
*H04L 41/0893* (2022.01)
*H04L 61/4511* (2022.01)

(52) U.S. Cl.
CPC ...... *H04L 41/0893* (2013.01); *H04L 61/4511* (2022.05)

(58) Field of Classification Search
CPC .......................... H04L 41/0893; H04L 61/4511
See application file for complete search history.

(56) References Cited

U.S. PATENT DOCUMENTS

| | | | | |
|---|---|---|---|---|
| 6,564,261 | B1* | 5/2003 | Gudjonsson | H04L 67/14 379/900 |
| 9,148,460 | B1* | 9/2015 | Sun | H04L 67/55 |
| 2007/0208803 | A1* | 9/2007 | Levi | H04L 51/214 709/203 |
| 2008/0256204 | A1* | 10/2008 | Kamat | H04L 51/224 709/206 |
| 2010/0217872 | A1* | 8/2010 | Martchenko | H04L 67/60 709/227 |
| 2010/0262650 | A1* | 10/2010 | Chauhan | H04L 67/55 709/203 |
| 2011/0060801 | A1* | 3/2011 | Virk | H04L 51/224 709/206 |
| 2011/0167474 | A1* | 7/2011 | Sinha | G06F 21/51 726/1 |
| 2012/0159235 | A1* | 6/2012 | Suganthi | G06F 11/2048 714/E11.073 |
| 2013/0047034 | A1* | 2/2013 | Salomon | G06Q 20/3224 709/217 |
| 2013/0111572 | A1* | 5/2013 | Gaddam | H04L 9/3226 726/7 |

(Continued)

OTHER PUBLICATIONS

Apple Developer; "Framework User Notifications: Push user-facing notifications to the user's device from a server, or generate them locally from your app"; webpage; located at: https://developer.apple.com/documentation/usernotifications; accessed on Sep. 20, 2022; 4 pages.

(Continued)

*Primary Examiner* — Jimmy H Tran
(74) *Attorney, Agent, or Firm* — MASCHOFF BRENNAN

(57) ABSTRACT

Methods and systems for efficient scaling of a domain name system (DNS) service architecture. In some embodiments a plurality of messaging servers may be separated into a number of pools. A plurality of client devices may be connected to a messaging server within a pool. When a notification is received for a target client device, a backend server may identify the pool that includes the messaging server that is connected to the target client device. The backend server may send the notification to the group of messaging servers within the identified pool while avoiding sending the notification to messaging servers within different pools.

20 Claims, 4 Drawing Sheets

(56) References Cited

U.S. PATENT DOCUMENTS

| | | | | |
|---|---|---|---|---|
| 2013/0117382 A1* | 5/2013 | Gaddam | H04L 51/58 | 709/206 |
| 2013/0155963 A1* | 6/2013 | Cillis | H04W 4/00 | 370/329 |
| 2013/0244614 A1* | 9/2013 | Santamaria | H04W 12/069 | 455/411 |
| 2014/0047078 A1* | 2/2014 | Wilson | H04L 51/214 | 709/219 |
| 2014/0280522 A1* | 9/2014 | Watte | H04L 51/52 | 709/203 |
| 2014/0304409 A1* | 10/2014 | Kamath | H04L 67/1036 | 709/225 |
| 2014/0304499 A1* | 10/2014 | Gopinath | H04L 63/168 | 713/151 |
| 2014/0344326 A1* | 11/2014 | Kamath | G06F 9/5027 | 709/203 |
| 2015/0074266 A1* | 3/2015 | Alisawi | H04L 67/10 | 709/224 |
| 2015/0100628 A1* | 4/2015 | LaPine | H04L 51/56 | 709/203 |
| 2015/0156122 A1* | 6/2015 | Singh | H04L 47/20 | 370/235 |
| 2015/0236970 A1* | 8/2015 | Rahman | H04W 4/20 | 370/216 |
| 2015/0261774 A1* | 9/2015 | McFerrin | H04L 67/34 | 707/803 |
| 2015/0350854 A1* | 12/2015 | Pollack | H04L 51/56 | 455/466 |
| 2016/0087933 A1* | 3/2016 | Johnson | H04L 41/08 | 709/245 |
| 2016/0219089 A1* | 7/2016 | Murthy | H04L 51/58 | |
| 2016/0234686 A1* | 8/2016 | Bone | H04W 4/14 | |
| 2017/0078857 A1* | 3/2017 | Sah | H04W 28/0215 | |
| 2017/0250859 A1* | 8/2017 | Gheorghe | H04L 67/1004 | |
| 2017/0295148 A1* | 10/2017 | Wright | H04L 63/166 | |
| 2017/0317935 A1* | 11/2017 | Murthy | G06Q 20/326 | |
| 2017/0332421 A1* | 11/2017 | Sternberg | H04W 12/069 | |
| 2019/0182649 A1* | 6/2019 | Best | H04W 4/70 | |
| 2019/0253849 A1* | 8/2019 | Ryder | H04L 51/06 | |
| 2021/0144517 A1* | 5/2021 | Guim Bernat | H04L 67/10 | |
| 2021/0266784 A1* | 8/2021 | Luna | H04L 47/25 | |
| 2021/0385290 A1* | 12/2021 | Edamadaka | H04L 67/63 | |
| 2022/0337588 A1* | 10/2022 | Jarvis | H04L 63/0876 | |
| 2022/0350748 A1* | 11/2022 | Qian | G06F 12/023 | |
| 2023/0038335 A1* | 2/2023 | Edamadaka | G06F 9/542 | |

OTHER PUBLICATIONS

Google Drive for Developers > Drive API; "Push Notifications"; webpage; located at: https://developers.google.com/drive/api/guides/push; Sep. 19, 2022; 5 pages.

* cited by examiner

EFFICIENT SCALING OF A DOMAIN NAME SYSTEM SERVICE ARCHITECTURE

BACKGROUND

In many domain name system (DNS) service architectures, client devices are connected to messaging servers within the architecture and poll against one or more backend servers for notifications. Some of these systems may include a large number of messaging servers and a much larger number of connected client devices. Indeed, in some systems, individual messaging servers can serve hundreds of thousands of polling client devices simultaneously.

The backend server, however, does not know which messaging server is serving a particular client device at given time. Therefore, when the backend server receives a notification for a particular client device, the notification must be sent to all of the messaging servers. When the messaging server that is connected to the client device receives the notification, it can relay the notification to the client device. However, because the backend server does not know which messaging server the client device is connected to, the backend server must send the notification to all of the messaging servers in the architecture. In service architectures that receive and send a large number of notifications, this can cause serious performance bottlenecks as the number of messaging servers is scaled up to meet an increasing number of client devices.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for efficient scaling of a domain name system (DNS) service architecture may be performed, at least in part, by a computing device including one or more processors. The method may include separating a plurality of messaging servers into a number of separate pools n, wherein a first group of messaging servers from the plurality of messaging servers is part of a first server pool and a second group of messaging servers from the plurality of messaging servers is part of a second server pool; identifying, for a plurality of client devices, a corresponding pool within the number of separate pools n that includes a messaging server through which each client device within the plurality of client devices is assigned to receive notifications from a backend server; connecting each client device to a messaging server within the identified corresponding pool, wherein a first client device is connected to a messaging server within the first server pool; receiving a notification for the first client device; determining, by the backend server, that the first client device is in the first server pool; and sending the notification from the backend server to the first group of messaging servers in the first server pool such that the notification is not sent to the second group of messaging servers in the second server pool.

In some embodiments, the service architecture may be a notification platform and each client device within the plurality of client devices may be configured to long poll the plurality of messaging servers.

In some embodiments, the corresponding pool for each client device may be identified by consistently hashing a unique identifier, the unique identifier being a number that is known to the plurality of client devices and the backend server. In these embodiments, the unique identifier may be equal to the number of separate pools n.

In some embodiments, the corresponding pool for each client device may be identified by the backend server, which is configured to dynamically assign a pool to each client device in the plurality of client devices.

In some embodiments, the notification for the first client device may be sent to the first group of messaging servers from the backend server through a DNS entry point that corresponds to the first server pool.

In some embodiments, the notification may be a message to the first client device, a software update for the first client device, or a request that a user associated with the first client device update login information.

In some embodiments, one or more non-transitory computer-readable media may comprise one or more computer-readable instructions that, when executed by one or more processors of a computing device, cause the computing device to perform a method for efficient scaling of a domain name system (DNS) service architecture.

In some embodiments, a computing device comprising one or more processors and one or more non-transitory computer-readable media comprising one or more computer-readable instructions that, when executed by the one or more processors, may cause the computing device to perform a method for efficient scaling of a domain name system (DNS) service architecture.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
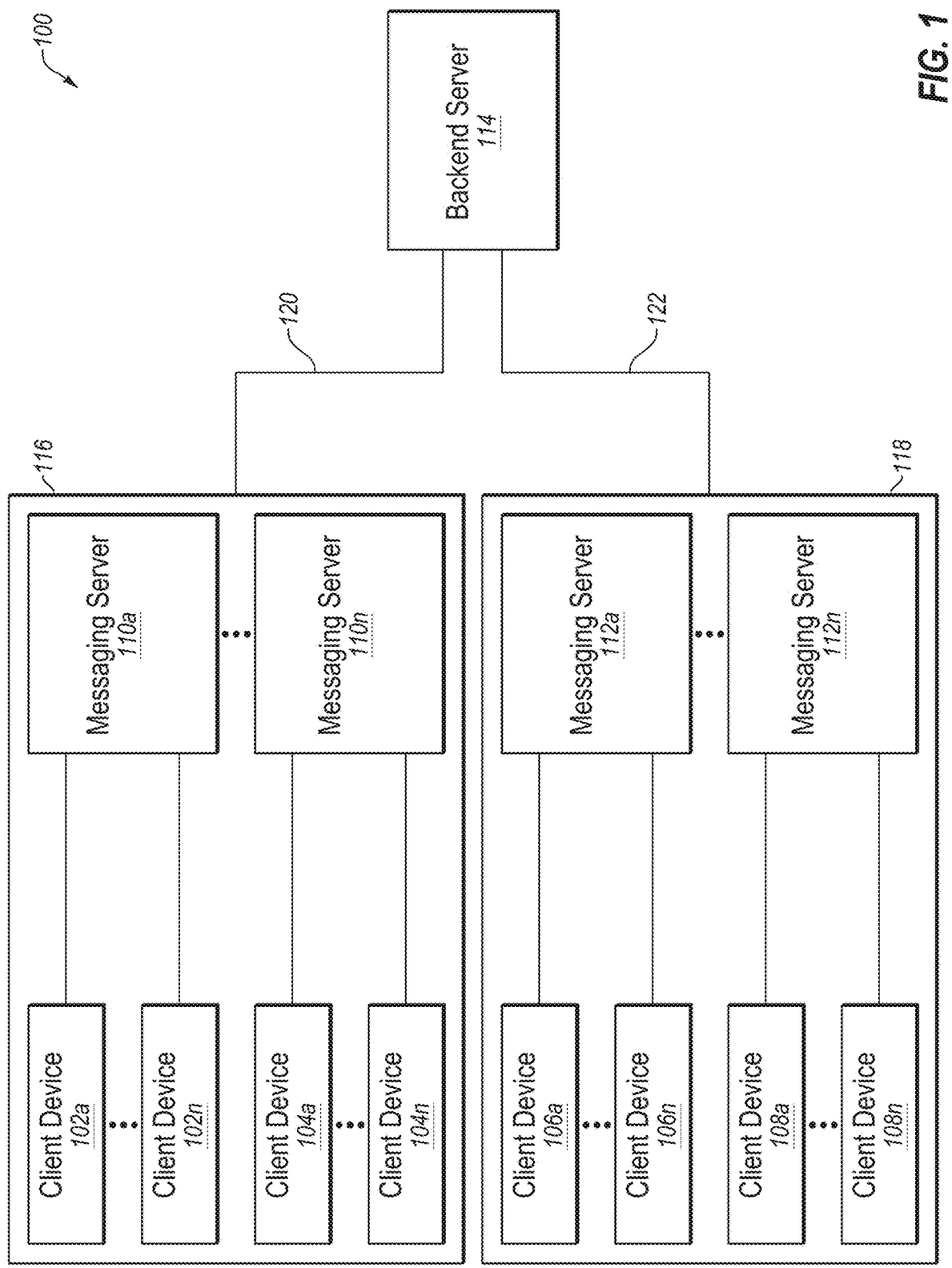
FIG. 1 illustrates an example of a DNS service architecture that has been scaled efficiently.

In many domain name system (DNS) service architectures, client devices are connected to messaging servers within the architecture and poll against one or more backend servers for notifications. These notifications can include messages to client devices, software updates for client devices, requests that users associated with the client devices update their login information, etc. These notifications can originate from any service architecture that utilizes DNS. For example, the service architecture may be notification platforms, web pools, game servers, etc. Some of these systems may include a large number of messaging servers and a much larger number of connected client devices. Indeed, in some systems, individual messaging servers can serve hundreds of thousands of polling client devices simultaneously.

The backend server in these service architectures, however, may not know which messaging server is serving a particular client device at given time. This is especially true when client devices migrate from one messaging server to another dynamically, for example, if a long poll is severed or the connected messaging server is taken offline.

Therefore, when the backend server receives a notification for a particular client device, the notification may be required to be sent to all of the messaging servers. When the messaging server that is connected to the client device receives the notification, it can relay the notification to the client device. However, because the backend server does not know which messaging server the client device is connected to, the backend server may need to send the notification to all of the messaging servers in the architecture. In service architectures that receive and send a large number of notifications, this can cause serious performance bottlenecks as the number of messaging servers is scaled up to meet an increasing number of client devices.

To avoid the performance issues created by service architectures that require notifications to be sent to all messaging servers within the architecture, embodiments disclosed herein may enable efficient scaling of a domain name system (DNS) service architecture. In particular, some embodiments may separate a plurality of messaging servers into a number of separate pools n. A first group of messaging servers from the plurality of messaging servers may be part of a first server pool and a second group of messaging servers from the plurality of messaging servers may be part of a second server pool. A corresponding pool within the number of separate pools n may be identified for a plurality of client devices. The corresponding pool may that include a messaging server through which each client device is assigned to receive notifications from a backend server. Each client device may be connected to a messaging server within the identified corresponding pool and a first client device may be connected to a messaging server within the first server pool. A notification may be received for the first client device and the backend server may determine that the first client device is in the first server pool. The backend server may send the notification to the first group of messaging servers in the first server pool while avoiding sending the notification the second group of messaging servers in the second server pool.

Turning to the figures, FIG. 1 illustrates an example of a DNS service architecture 100 that has been scaled efficiently. The DNS service architecture 100 may be any web service. In one embodiment, the DNS service architecture 100 may be a notification platform. Architecture 100 includes a plurality of client devices, including client devices 102a-102n, 104a-104n, 106a-106n, and 108a-108n. Each of these client devices is connected to one of messaging servers 110a-110n or 112a-112n. Specifically, the client devices 102a-102n are connected to the messaging server 110a. The client devices 104a-104n are connected to the messaging server 110n. The client devices 106a-106n are connected to the messaging server 112a. The client devices 108a-108n are connected to the messaging server 112n. Each of the messaging servers 110a-110n and 112a-112n are connected to a backend server 114.

In the DNS service architecture 100, the messaging servers are separated into pools. Specifically, the messaging servers 110a-110n are in a first pool 116. The messaging servers 112a-112n are in a second pool 118. The first pool 116 of messaging servers is connected to the backend server 114 through a first DNS entry point 120. The second pool 118 of messaging servers is connected to the backend server 114 through a second DNS entry point 122. The first and second DNS entry points may have different domain names.

In some embodiments, the domain names for the DNS entry points may include a number associated with the pool. For example, the first DNS entry point 120 may have a domain name entrypoint-1.norton.com. The second DNS entry point 122 may have a domain name entrypoint-2.norton.com. Additional DNS entry points may have entrypoint-n.norton.com domain names, where n is the number associated with the corresponding pool.

A DNS service architecture can include any number of separate pools and any number of messaging servers within each pool. Each pool within the number of separate pools may have its own unique entry point to the backend server 114 and associated domain name.

When a client device connects to the DNS service architecture 100, it may identify the pool to which it is assigned in a number of different ways. In a first embodiment, the client device may use a hash function h(x)=x mod N. In this hash function, the key x may be a numerical value that is associated with the client device, such as the client device's IP address. The mod value N may be a unique identifier. In one embodiment, the mod value N may be the total number of pools in the DNS service architecture 100 so that the unique identifier is consistently hashed to a number between 1 and n. In another embodiment, the client device may request and receive an identification of a pool within the DNS service architecture 100 to which the client device is assigned. In some embodiments, the pool may be identified by the backend server 114. The backend server 114 may store, in a database, the pool to which each of the connected client devices are assigned.

Once all of the client devices in the service architecture 100 have identified the messaging server pools to which they are assigned, they may be connected to an individual messaging servers within their assigned pools. In some embodiments, the client devices may be randomly connected to messaging servers within the assigned pools. The client devices may then begin polling the backend server 114 for notifications. In some embodiments, the client devices may long poll against the backend server 114 for notifications.

The backend server 114 may be connected to a plurality of backend services (not shown). In one embodiment, the notifications may originate from one or more of these backend services, which funnel the notifications through the backend server 114. When a notification is received at the backend server 114 for a target client device, the backend server 114 may determine the pool to which the target client device was assigned. The backend server 114 may do this by using the same hash function and unique identifier that the target client device used to determine its appropriate pool. Alternatively, if the target client device was assigned to an identified pool, the backend server 114 may look up in the database the pool to which the target client device was assigned.

Once the backend server 114 knows which pool the target client device is in, it may send the notification to only those messaging servers that are within the identified pool through a pre-allocated DNS entry point. For example, if a notification is received for the client device 102a, the backend server 114 may send the notification to the messaging servers 110a-110n within the first pool 116 through the DNS entry point 120, which connects the backend server 114 to the first pool 116. Significantly, the backend server 114 is not required to send the notification to client device 102a to any messaging servers within any other pools, such as the second pool 118. Thus, while the notification will be sent to messaging servers 110a-110n of the first pool 116, the notification may not be sent to messaging servers 112a-112n of the second pool 118, or any other pool within the DNS service architecture 100.

Figure 2:
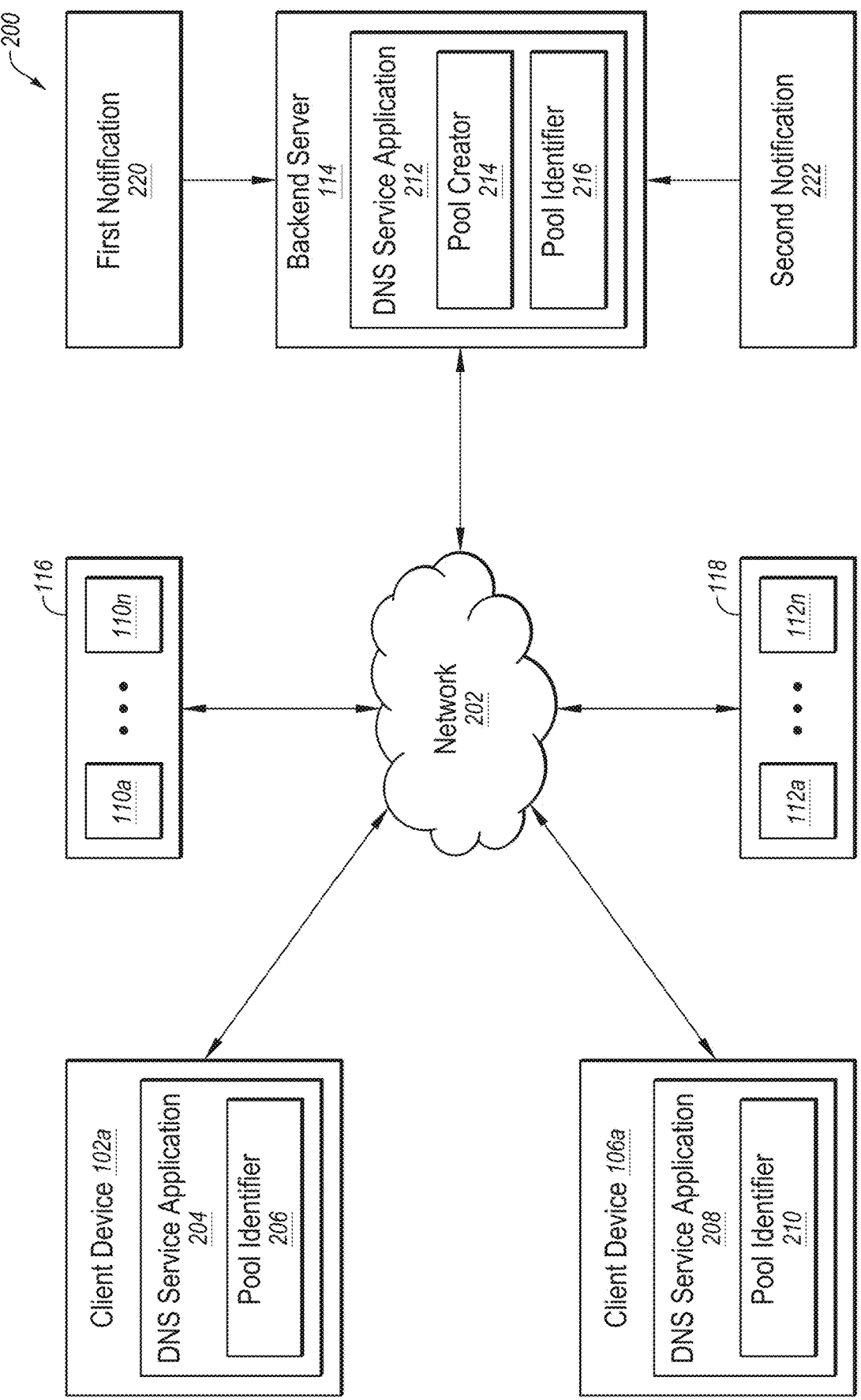
FIG. 2 illustrates a system for efficiently scaling the DNS service architecture of FIG. 1.

FIG. 2 illustrates a system 200 for efficiently scaling the DNS service architecture illustrated in FIG. 1. The system 200 may include a network 202, the client device 102a, the client device 106a, the first pool 116 of messaging servers 110a-110n, the second pool 118 of messaging servers 112a-112n, and the backend server 114.

In some embodiments, the network 202 may be configured to communicatively couple the client device 102a, the client device 106a, the messaging servers 110a-110n and 112a-112n, and the backend server 114. In some embodiments, the network 202 may be any wired or wireless network, or combination of multiple networks, configured to send and receive communications between systems and devices. In some embodiments, the network 202 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
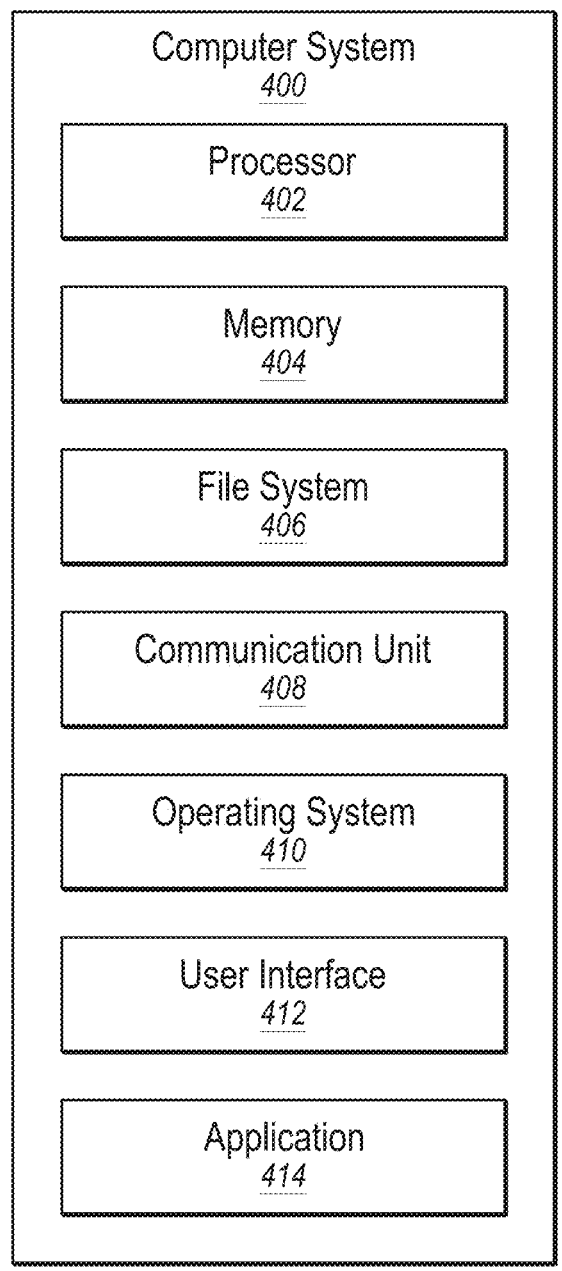
FIG. 4 illustrates an example computer system that may be employed in efficiently scaling a DNS service architecture.

In some embodiments, the client device 102a may be any computer system capable of communicating over the network 202 and connecting to a DNS service architecture, examples of which are disclosed herein in connection with the computer system 400 of FIG. 4. The client device 102a may include a DNS service application 204. The DNS service application may include a pool identifier 206. The pool identifier may identify what pool that the client device 102a should connect to the backend server 114 through.

The pool identifier 206 may identify an appropriate pool in a number of different ways. For example, the pool identifier may use a hash function. In some embodiments, the hash function may be a consistent hash function where the key is a numerical value that is associated with the client device 102a, such as the IP address of client device 102a. The hash function may use a unique identifier for a mod value. In one embodiment, the mod value may be the total number of pools in a DNS service architecture. In another embodiment, the client device 102a may request and receive an identification of a pool within the DNS service architecture to which the client device 102a is assigned. In some embodiments, the pool may be identified by the backend server 114.

In some embodiments, the client device 106a may be any computer system capable of communicating over the network 202 and connecting to a DNS service architecture, examples of which are disclosed herein in connection with the computer system 400 of FIG. 4. The client device 106a may include a DNS service application 208. The DNS service application may include a pool identifier 210. The pool identifier may identify what pool that the client device 106a should connect to the backend server 114 through. The pool identifier 210 may identify an appropriate pool in that same ways that pool identifier 206 identifies an appropriate pool for client device 102a.

The messaging servers 110a-110n and 112a-112n may be any computer systems capable of communicating over the network 202 and delivering notifications to one or more client devices within the DNS service architecture, examples of which are disclosed herein in connection with the computer system 400 of FIG. 4.

In some embodiments, the backend server 114 may be any computer system capable of communicating over the network 202 and receiving and sending notifications for one or more client devices within the DNS service architecture, examples of which are disclosed herein in connection with the computer system 400 of FIG. 4. The backend server 114 may also include a DNS service application 212. The DNS service application 212 may include a pool creator 214 and a pool identifier 216.

The pool creator 214 may separate the messaging servers within the DNS service architecture into a plurality of pools. For example, the pool creator 214 may place messaging servers 110a-110n into the first pool 116 and messaging servers 112a-112n into the second pool 118. The pool identifier 216 may be configured to identify a pool to which a client device within the DNS service architecture belongs. For example, if the backend server 114 receives a notification for a target client device, the pool identifier 216 may determine the pool that includes a messaging server that is connected to the target client device. In one embodiment, the pool identifier 216 may identify the pool by consistently hashing the same unique identifier that the target client device used to identify its pool. For example, if the target client device used the total number of pools in the service architecture as the unique identifier, the pool identifier 216 may also use the total number of pools as the unique identifier to determine the pool of the target client device.

The backend server 114 may be configured to communicate with the messaging servers 110a-110n within the first pool 116 through a first DNS entry point. The backend server 114 may be configured to communicate with the messaging servers 112a-112n within the second pool 118 through a second DNS entry point.

In one embodiment, the client device 102a may be connected to the messaging server 110a within the first pool 116 and the client device 106a may be connected to the messaging server 112a within the second pool 118. If the backend server 114 receives a first notification 220 for the client device 102a, the backend server 114 may determine, through the pool identifier 216, that the client device 102a is connected to a messaging server within the first pool 116. Once the backend server 114 has determined that the client device 102a is connected to a messaging server within the first pool 116, it may send the notification through the first DNS entry point to the messaging servers 110a-110n within the first pool 116. The backend server 114 may avoid the need to send the first notification 220 to the messaging servers 112a-112n in the second pool 118.

On the other hand, if the backend server 114 receives a second notification 222 for the client device 106a, the backend server 114 may determine, through the pool identifier 216, that the client device 106a is connected to a messaging server within the second pool 118. Once the backend server 114 has determined that the client device 106a is connected to a messaging server within the second pool 118, it may send the notification through the second DNS entry point to the messaging servers 112a-112n within the second pool 118. The backend server 114 may avoid the need to send the second notification 222 to the messaging servers 110a-110n in the first pool 116.

Modifications, additions, or omissions may be made to the system 200 without departing from the scope of the present disclosure. For example, in some embodiments, the system 100 may include additional components similar to the components illustrated in FIG. 2 that each may be configured similarly to the components illustrated in FIG. 2.

Figure 3:
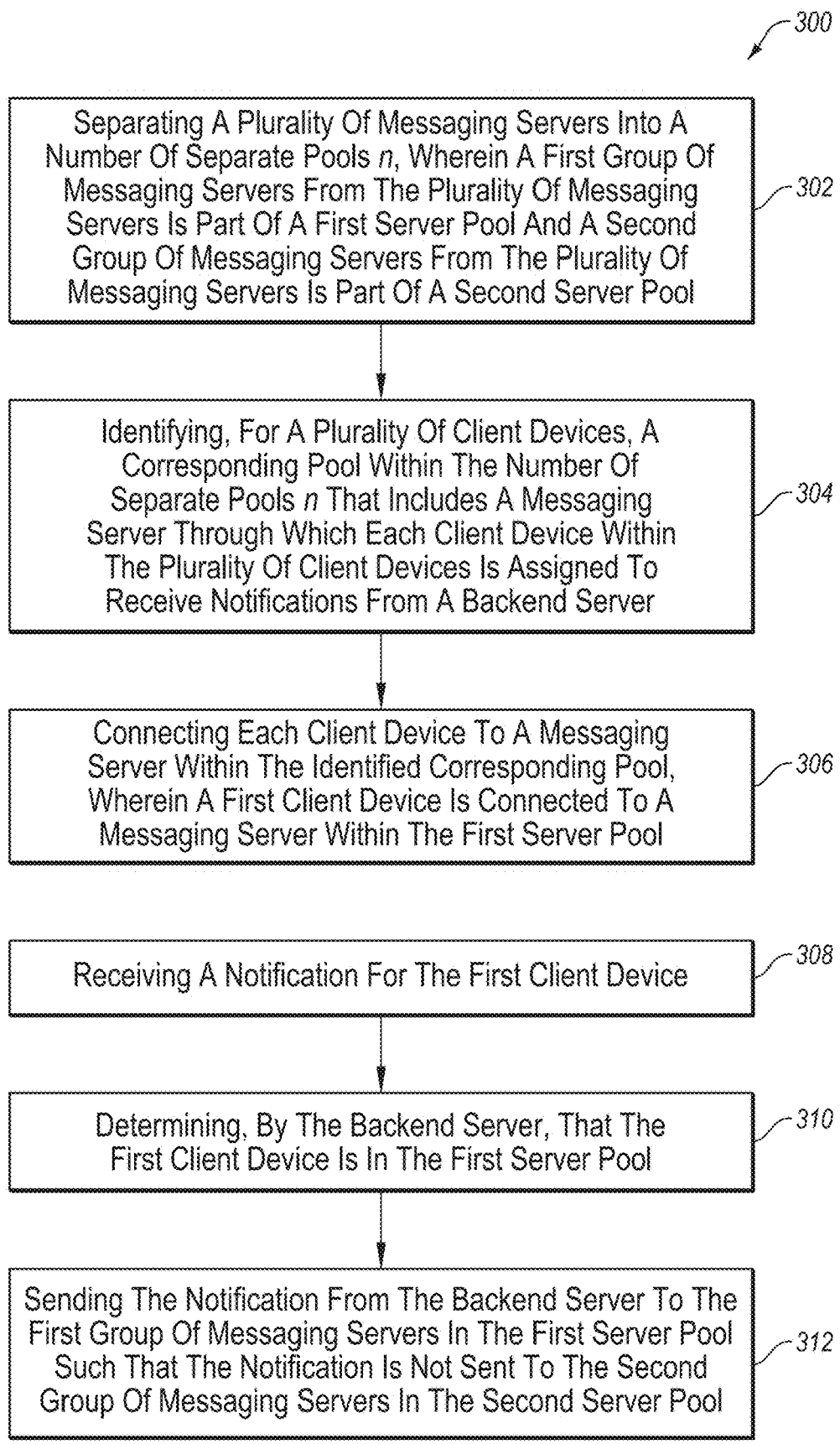
FIG. 3 is a flowchart of an example method for efficiently scaling a DNS service architecture.

FIG. 3 is a flowchart of an example method 300 for efficiently scaling a DNS service architecture. The method 300 may be performed, in some embodiments, by a device or system, such as by the DNS service applications 204, 208, and 212. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at action 302, separating a plurality of messaging servers into a number of separate pools n, wherein a first group of messaging servers from the plurality of messaging servers is part of a first server pool and a second group of messaging servers from the plurality of messaging servers is part of a second server pool. Any number of messaging servers may be included within a pool. In addition, a DNS service architecture may include any number of separate pools n.

The method 300 may include, at action 304, identifying, for a plurality of client devices, a corresponding pool within the number of separate pools n that includes a messaging server through which each client device within the plurality of client devices is assigned to receive notifications from a backend server. For example, a client device may identify the pool to which it is assigned by consistently hashing a unique identifier. In one embodiment, this unique identifier may be the number of separate pools n in the DNS service architecture.

The method 300 may include, at action 306, connecting each client device to a messaging server within the identified corresponding pool. Once a client device has determined its corresponding pool, it may be assigned to a messaging server within the corresponding pool at random. In one embodiment, a first client device may be connected to a messaging server within the first server pool.

The method 300 may include, at action 308, receiving a notification for the first client device. For example, the notification may be received by a backend server from a service provider. The notification could be a message, a software update, a request that the user update his or her login information, etc.

The method 300 may include, at action 310, determining, by the backend server, that the first client device is in the first server pool. In one embodiment, the backend server may identify the pool to which the first client device is assigned by consistently hashing a unique identifier. In one embodiment, this unique identifier may be the same number that the first client device used to identify a corresponding pool. For example, the unique identifier may be the separate pools n in the DNS service architecture.

The method 300 may include, at action 312, sending the notification from the backend server to the first group of messaging servers in the first server pool such that the notification is not sent to the second group of messaging servers in the second server pool. In some embodiments, the notification may be sent through a DNS entry point that is pre-allocated to the first server pool.

The method 300 may thus be employed, in some embodiments, to efficiently scale a DNS service architecture. By separating messaging servers into pools, and providing a way that a backend server can determine the pool to which a client device belongs, the messaging server can limit distribution of notifications to the messaging servers within the pool to which a target client device belongs. The backend server can avoid the need to send the notification to all of the messaging servers within the DNS service architecture.

Although the actions of the method 300 are illustrated in FIG. 3 as discrete actions, various actions may be divided into additional actions, combined into fewer actions, reordered, expanded, or eliminated, depending on the desired implementation.

Further, it is understood that the method 300 may improve the functioning of a computer system itself. For example, the functioning of the DNS service architecture may itself be improved by the method 300. For example, the efficiency with which notifications are sent from a backend server to a client device may be improved by the method 300. By eliminating the need for the backend server to send notifications to all messaging servers within the architecture, and limiting distribution of the notification to a subset of messaging servers within a single pool, performance bottlenecks can be avoided, especially in systems that receive and distribute a large number of notifications to many different client servers.

Also, the method 300 may improve the technical field of notification distribution in DNS service architectures. By limiting the number of messaging servers to which notifications must be sent, efficiencies can be realized. This is a significant improvement over notification distribution in conventional DNS service architectures, which require notifications to be sent to all messaging servers within the architecture.

FIG. 4 illustrates an example computer system 400 that may be employed in efficiently scaling a DNS service architecture. In some embodiments, the computer system 400 may be part of any of the systems or devices described in this disclosure. For example, the computer system 400 may be part of any of the client devices 102a-102n, 104a-104n, 106a-106n, 108a-108n, the messaging servers 110a-110n, 112a-112n, and the backend server 114.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the DNS service applications 204 and 212 of FIG. 2, or in some combination thereof.

The communication unit 408 may include any component, device, system, or combination thereof configured to transmit or receive information over a network, such as the network 202 of FIG. 2. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as any one of the DNS service applications 204 and 212 of FIG. 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for efficient scaling of a domain name system (DNS) service architecture, at least a portion of the method being performed by a computing device comprising one or more processors, the method comprising:

separating a plurality of messaging servers into a number of separate pools n, wherein a first group of messaging servers that includes two or more messaging servers from the plurality of messaging servers is part of a first server pool and a second group of messaging servers that includes two or more messaging servers from the plurality of messaging servers is part of a second server pool;

identifying, for a plurality of client devices, a corresponding pool within the number of separate pools n that includes a messaging server through which each client device within the plurality of client devices is assigned to receive notifications from a backend server;

connecting each client device to a messaging server within the identified corresponding pool, wherein a first client device is connected to a messaging server within the first server pool;

receiving, at the backend server, a notification for the first client device;

determining, by the backend server, that the first client device is connected to one of the two or more messaging servers in the first server pool; and sending the notification from the backend server to the first group of two or more messaging servers in the first server pool such that the notification is not sent to the second group of two or more messaging servers in the second server pool.

2. The method of claim 1, wherein the service architecture is a notification platform and each client device within the plurality of client devices is configured to long poll the plurality of messaging servers.

3. The method of claim 1, wherein the corresponding pool for each client device is identified by consistently hashing a unique identifier, the unique identifier being a number that is known to the plurality of client devices and the backend server.

4. The method of claim 3, wherein the unique identifier is equal to the number of separate pools n.

5. The method of claim 1, wherein the corresponding pool for each client device is identified by the backend server, which is configured to dynamically assign a pool to each client device in the plurality of client devices.

6. The method of claim 1, wherein the notification for the first client device is sent to the first group of two or more messaging servers from the backend server through a DNS entry point that corresponds to the first server pool.

7. The method of claim 1, wherein the notification is a message to the first client device, a software update for the first client device, or a request that a user associated with the first client device update login information.

8. One or more non-transitory computer-readable media comprising one or more computer-readable instructions that, when executed by one or more processors of a computing device, cause the computing device to perform a method for efficient scaling of a domain name system (DNS) service architecture, the method comprising:

separating a plurality of messaging servers into a number of separate pools n, wherein a first group of messaging servers that includes two or more messaging servers from the plurality of messaging servers is part of a first server pool and a second group of messaging servers that includes two or more messaging servers from the plurality of messaging servers is part of a second server pool;

identifying, for a plurality of client devices, a corresponding pool within the number of separate pools n that includes a messaging server through which each client device within the plurality of client devices is assigned to receive notifications from a backend server;

connecting each client device to a messaging server within the identified corresponding pool, wherein a first client device is connected to a messaging server within the first server pool;

receiving, at the backend server, a notification for the first client device;

determining, by the backend server, that the first client device is connected to one of the two or more messaging servers in the first server pool; and sending the notification from the backend server to the first group of two or more messaging servers in the first server pool such that the notification is not sent to the second group of two or more messaging servers in the second server pool.

9. The one or more non-transitory computer-readable media of claim 8, wherein the service architecture is a notification platform and each client device within the plurality of client devices is configured to long poll the plurality of messaging servers.

10. The one or more non-transitory computer-readable media of claim 8, wherein the corresponding pool for each client device is identified by consistently hashing a unique identifier, the unique identifier being a number that is known to the plurality of client devices and the backend server.

11. The one or more non-transitory computer-readable media of claim 10, wherein the unique identifier is equal to the number of separate pools n.

12. The one or more non-transitory computer-readable media of claim 8, wherein the corresponding pool for each client device is identified by the backend server, which is configured to dynamically assign a pool to each client device in the plurality of client devices.

13. The one or more non-transitory computer-readable media of claim 8, wherein the notification for the first client device is sent to the first group of two or more messaging servers from the backend server through a DNS entry point that corresponds to the first server pool.

14. The one or more non-transitory computer-readable media of claim 8, wherein the notification is a message to the first client device, a software update for the first client device, or a request that a user associated with the first client device update login information.

15. A computing device comprising:
one or more processors; and
one or more non-transitory computer-readable media comprising one or more computer-readable instructions that, when executed by the one or more processors, cause the computing device to perform a method for efficient scaling of a domain name system (DNS) service architecture, the method comprising:
separating a plurality of messaging servers into a number of separate pools n, wherein a first group of messaging servers that includes two or more messaging servers from the plurality of messaging servers is part of a first server pool and a second group of messaging servers that includes two or more messaging servers from the plurality of messaging servers is part of a second server pool;
identifying, for a plurality of client devices, a corresponding pool within the number of separate pools n that includes a messaging server through which each client device within the plurality of client devices is assigned to receive notifications from a backend server;
connecting each client device to a messaging server within the identified corresponding pool, wherein a first client device is connected to a messaging server within the first server pool;
receiving, at the backend server, a notification for the first client device;
determining, by the backend server, that the first client device is connected to one of the two or more messaging servers in the first server pool; and
sending the notification from the backend server to the first group of two or more messaging servers in the first server pool such that the notification is not sent to the second group of two or more messaging servers in the second server pool.

16. The one or more non-transitory computer-readable media of claim 15, wherein the service architecture is a notification platform and each client device within the plurality of client devices is configured to long poll the plurality of messaging servers.

17. The one or more non-transitory computer-readable media of claim 16, wherein the corresponding pool for each client device is identified by consistently hashing a unique identifier, the unique identifier being a number that is known to the plurality of client devices and the backend server.

18. The one or more non-transitory computer-readable media of claim 17, wherein the unique identifier is equal to the number of separate pools n.

19. The one or more non-transitory computer-readable media of claim 16, wherein the corresponding pool for each client device is identified by the backend server, which is configured to dynamically assign a pool to each client device in the plurality of client devices.

20. The one or more non-transitory computer-readable media of claim 16, wherein the notification for the first client device is sent to the first group of two or more messaging servers from the backend server through a DNS entry point that corresponds to the first server pool.

* * * * *